Nov. 6, 1923.
F. MÜLLER
1,472,852
MACHINE FOR MILLING BLANKS
Original Filed Feb. 15, 1918    4 Sheets-Sheet 3
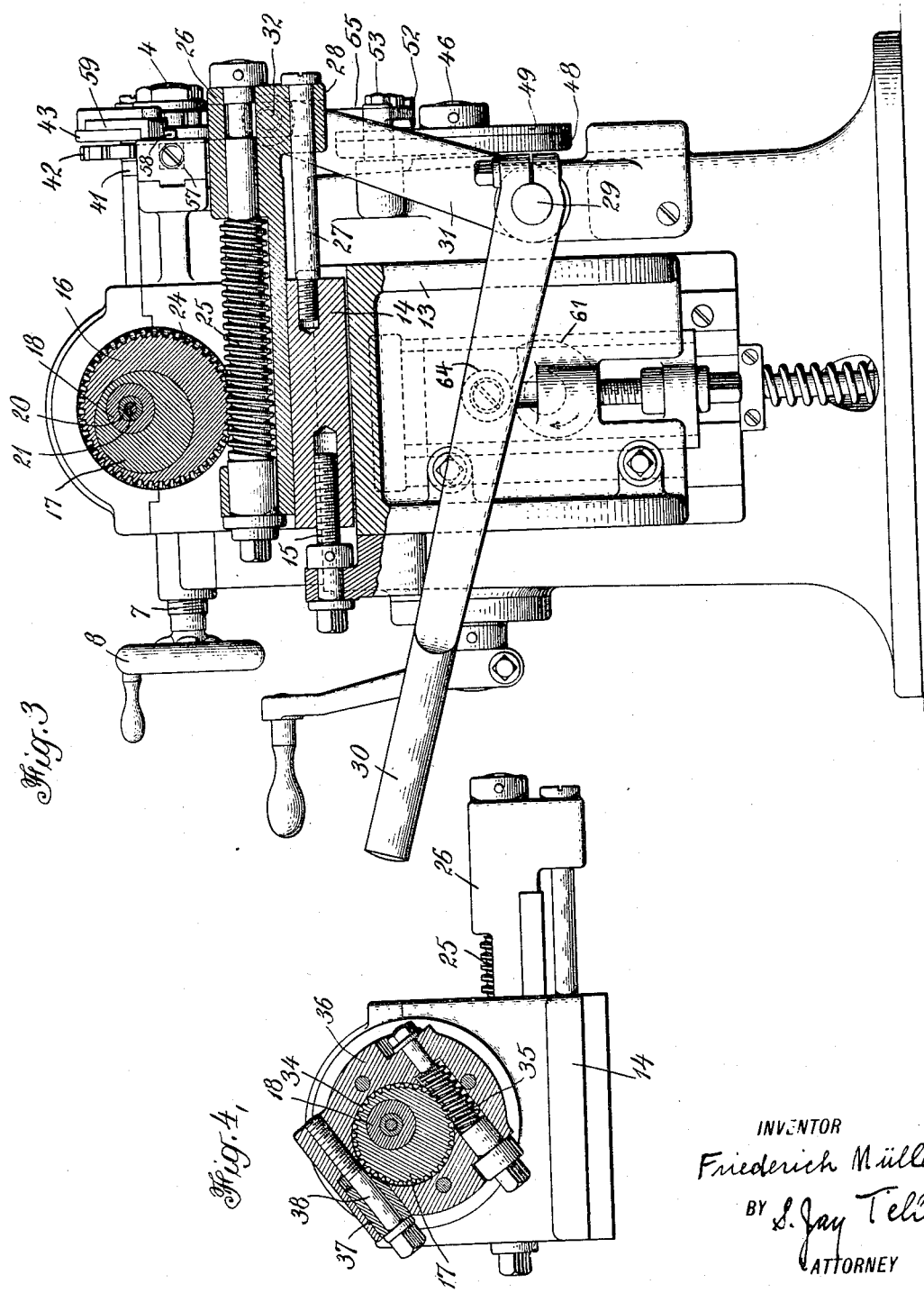
INVENTOR
Friederich Müller
BY S. Jay Telier
ATTORNEY

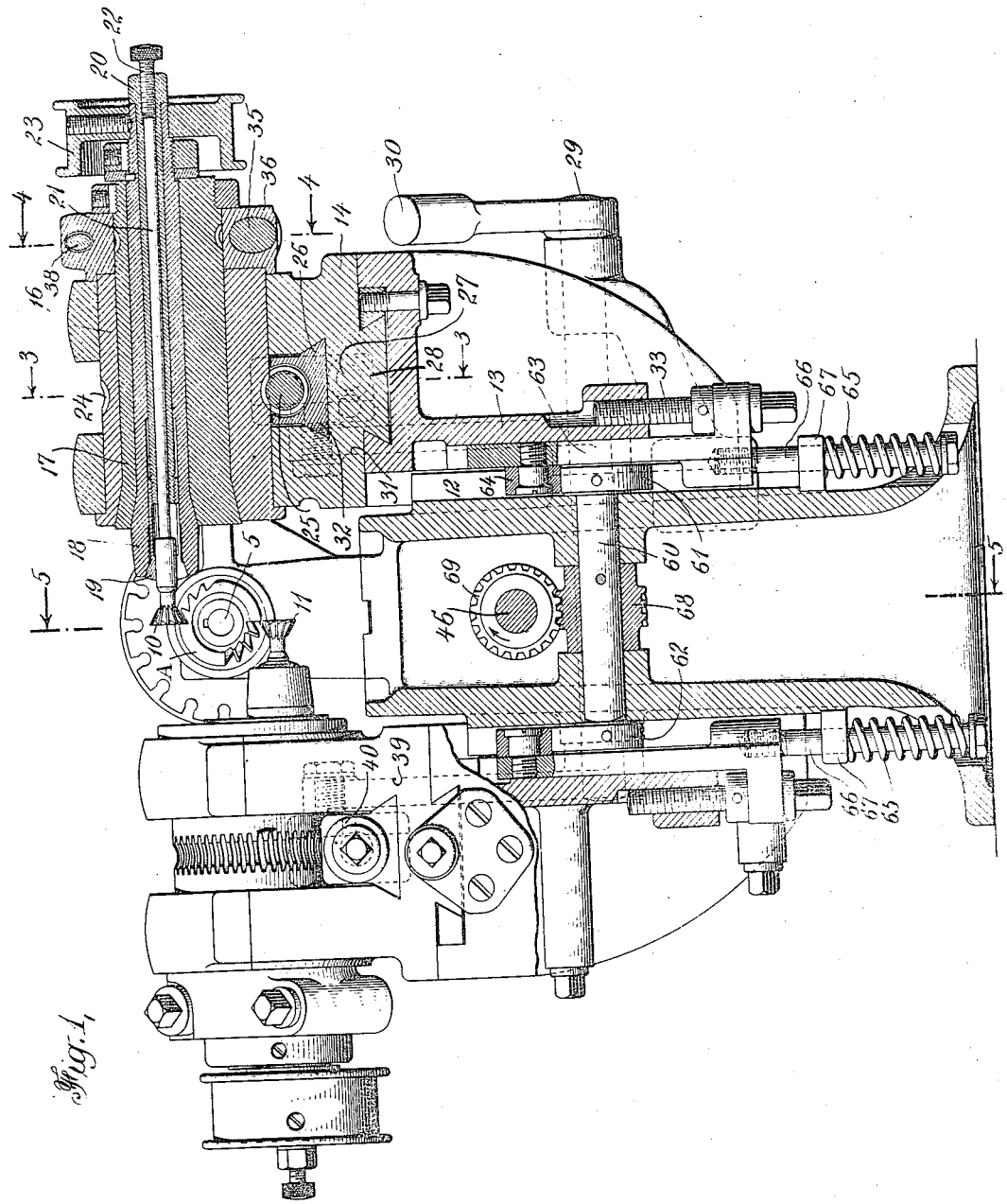

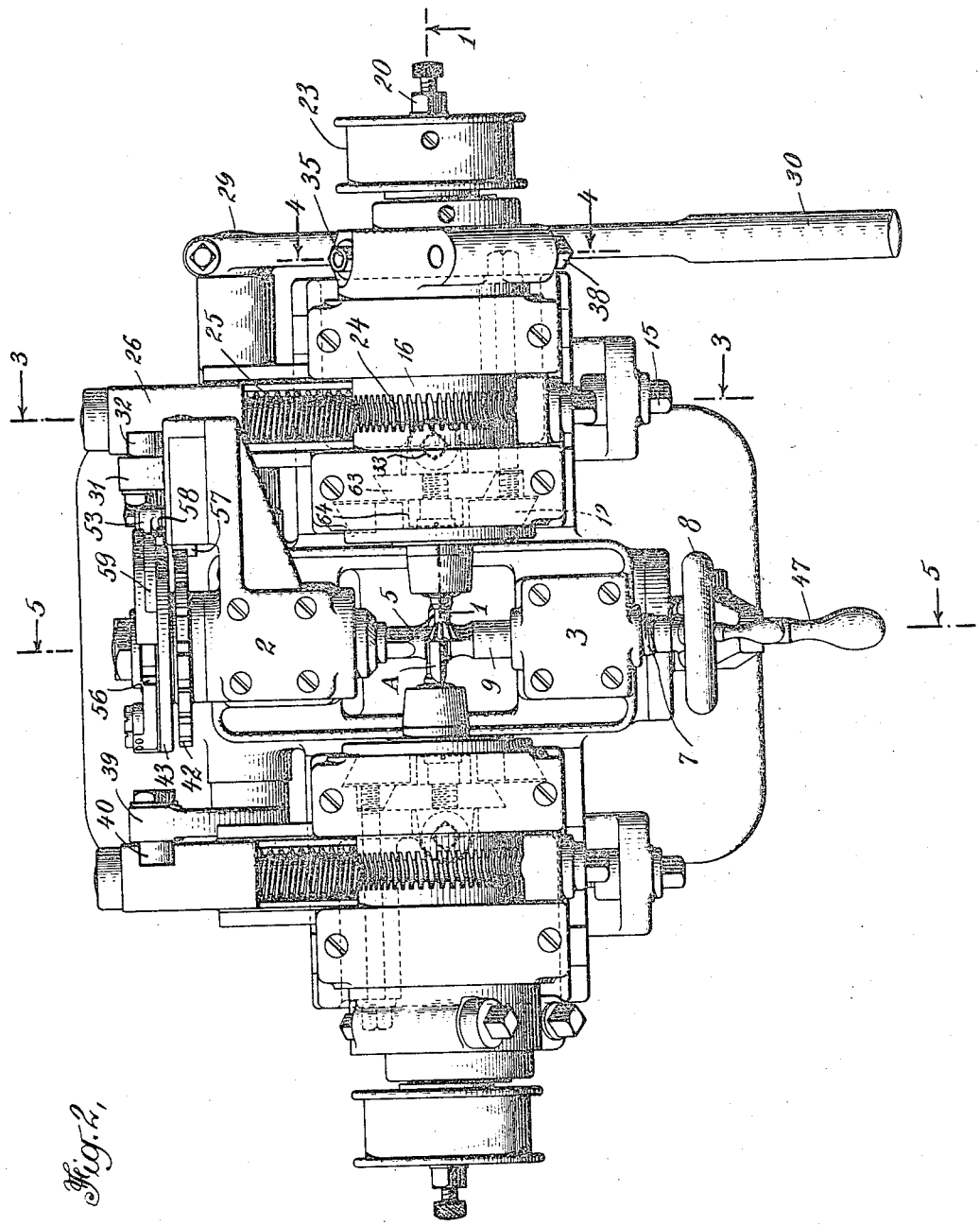

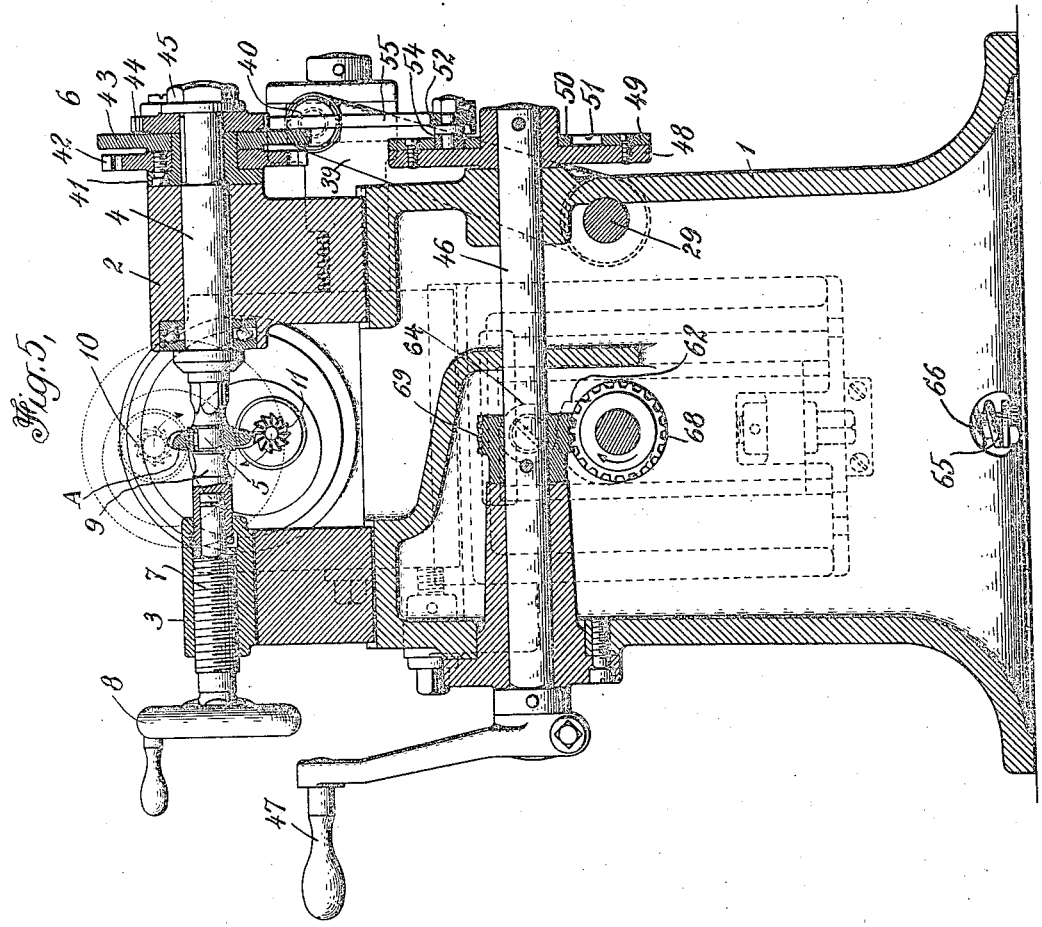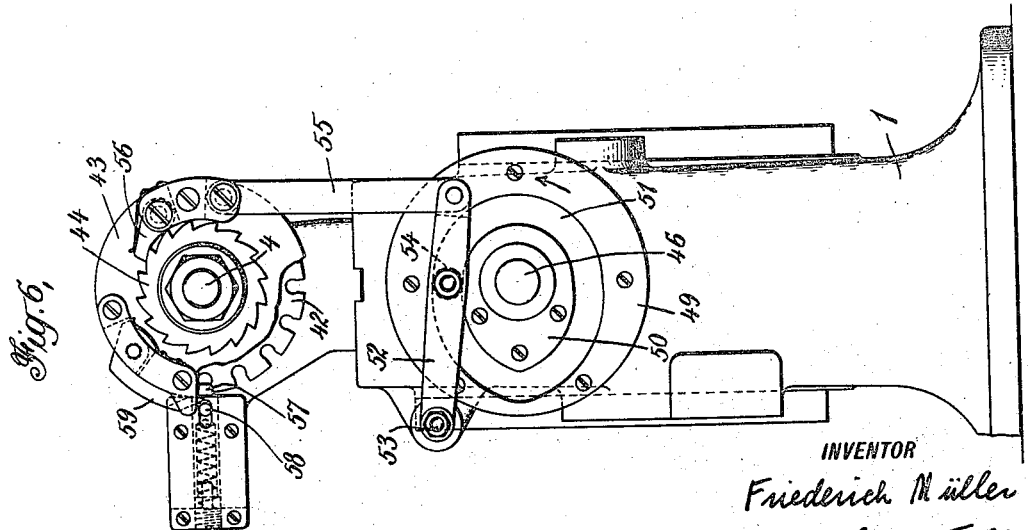

Patented Nov. 6, 1923.

1,472,852

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

MACHINE FOR MILLING BLANKS.

Application filed February 15, 1918, Serial No. 217,323. Renewed January 27, 1922. Serial No. 532,259.

*To all whom it may concern:*

Be it known that I, FRIEDERICH MÜLLER, a citizen of the United States, residing at Hartford, in the county of Hartford and State of Connecticut, have invented certain new and useful Improvements in Machines for Milling Blanks, of which the following is a specification.

A machine embodying the invention is intended for the milling of axial or longitudinal grooves in blanks particularly for the milling of grooves in blanks for milling cutters. These grooves are so shaped and spaced as to form the teeth which do the cutting when the finished cutter is used. The invention is particularly applicable to a machine intended for the milling of grooves in formed cutters having parts of their contour in the form of circular arcs. In some cases the contours may be complete semi-circular arcs extending the entire width of the cutter, and in other cases the arcs may be less than semi-circular. For a cutter that is to be used for milling the grooves in twist drills, the contour consists of two arcs of approximately 90° each, having different radii. A machine embodying the invention is particularly well adapted for cutting the grooves in blanks to form cutters of this type.

The principal object of the invention, therefore, is to provide a machine for milling grooves in blanks simultaneously at two points which are preferably opposite each other. A further object of the invention is to provide improved means for feeding and guiding the cutters to cause them to cut arcuate grooves. Still another object of the invention is to provide improved means for adjusting the cutters to change the axes of their arcuate movements or to change the radii of their arcuate movements, or both. A further object of the invention is to provide improved means for withdrawing the cutters from the blank in order to permit indexing. Still another object of the invention is to provide improved means whereby the withdrawal of the cutters and the indexing are effected in proper relation to each other by a single mechanism. Still further objects of the invention will be apparent from the following specification and claims.

In the accompanying drawings I have shown the embodiment of the invention which I now deem preferable, but it will be understood that the drawings are for illustrative purposes only and are not to be construed as defining or limiting the scope of the invention, the accompanying claims being relied upon for that purpose.

Of the drawings:

Fig. 1 is a front elevation, partly in section, along the line 1—1 of Fig. 2.

Fig. 2 is a plan view.

Fig. 3 is a left end view, partly in section, along the lines 3—3 of Figs. 1 and 2.

Fig. 4 is a fragmentary sectional view taken along the lines 4—4 of Figs. 1 and 2.

Fig. 5 is a transverse sectional view taken along the lines 5—5 of Figs. 1 and 2.

Fig. 6 is a rear view showing the central part of the machine, the side parts carrying the cutters being removed for the sake of simplicity.

Referring to the drawings, 1 represents the main frame or bed upon which the other parts of the machine are mounted. Mounted upon the bed 1 I provide means for holding a blank to be milled. This means preferably comprises a headstock 2 and a tailstock 3, preferably mounted in fixed positions. The headstock and tailstock constructions are shown most clearly in Fig. 5. The headstock is provided with a spindle 4 which is rotatably mounted and which carries at its inner end an arbor 5. This arbor is adapted to fit the central aperture of a cutter blank A to be milled, the blank being suitably keyed in place. During the cutting operation the spindle 4 is held against rotation but it can be indexed from time to time by means of the indexing mechanism 6 which will be described in detail hereinafter. The tailstock 3 is provided with a threaded aperture which is in alinement with the spindle 4. Fitted in this aperture is a screw 7 operable by means of a hand wheel 8. The screw 7 has a reduced inner end upon which is rotatably mounted a plunger 9. This plunger is adapted to abut against the blank A and to hold it firmly in place on the arbor 5. By means of the screw 7 and the hand wheel 8, the plunger can be withdrawn to permit a blank to be removed and can be then pushed inward to engage a new blank.

Two cutters are provided for operating simultaneously on the blank A, preferably at opposite sides thereof. As illustrated, one cutter 10 is positioned to act at the top and the other cutter 11 is positioned to act at the bottom. Cutters of any shape may be used, but, for cutting the grooves in milling cutters, the cutters 10 and 11 are in form of truncated cones, as shown. The cutters can be simultaneously fed transversely of the blank, preferably in opposite directions. In the preferred embodiment of the invention, the cutters move in arcuate paths about axes perpendicular to the blank axis and intersecting the body of the blank. The paths of movement are indicated by arrows in Fig. 5. The cutters can be adjusted preferably independently, to move the axes or to change the radii or both. The mechanism for supporting, adjusting and rotating the two cutters are similar and it will be sufficient to describe but one of them in detail.

The frame 1 is provided at its left side with a vertical dovetailed guideway 12 along which a bracket 13 is vertically movable. The bracket is provided at its top with a horizontal transverse guideway in which is fitted a slide 14. For moving the slide 14 there is provided a screw 15. The slide 14 has a large longitudinal bearing aperture in which is rotatably mounted a sleeve 16 having an eccentric aperture therein. Rotatably mounted in the eccentric aperture of the sleeve 16 is a sleeve 17 also having an eccentric aperture therein. Rotatably mounted in the eccentric aperture of the sleeve 17 is a spindle 18 provided at its inner end with a draw collet chuck 19 adapted to grip the shank of the cutter 10. The chuck is adapted to be opened and closed by means of a hollow shaft 20 having a squared end. Extending through the shaft 20 is a stop rod 21 which is adjustable by means of a screw 22, and which is adapted at limit the inward movement of the cutter 10. Ordinarily the cutter is positioned, as shown, with its radial face in a plane intersecting the axis of the blank. If desired however, the cutter can be positioned to slightly undercut the resulting teeth on the blank. At the outer end of the spindle 17 is a belt pulley 23 by means of which the spindle can be driven to rotate the cutter 10.

It will be seen that the axis of the cutter 10 is located eccentrically of the axis of the sleeve 16. During the cutting operation the sleeve 16 is turned, and because of the eccentricity the spindle and the cutter are moved along arcuate lines, the cutter serving to cut a groove in the blank, the groove being arcuate along vertical planes parallel with the axis of the blank.

The sleeve 16 is provided with a circular series of teeth preferably in the form of worm teeth 24, which form a worm wheel adapted to mesh with a horizontal transverse toothed element preferably in the form of a worm 25. The worm is rotatably mounted in bearings in a slide 26, this slide fitting a suitable guideway in the slide 14. The worm is provided with a squared end whereby it may be turned. It will be clear that the sleeve 16 may be turned either by turning the worm 25 or by moving the slide 26 to bodily move the worm longitudinally. When the worm is thus moved bodily it acts as a rack. For limiting the rearward movement of the slide and of the worm, there is provided a headed screw 27 which is threaded into the slide 14 and which extends through an aperture in a boss 28 depending from the slide 26. Forward movement is limited by the engagement of the boss 28 with the slide 14.

For rotating the sleeve 16 to feed the cutter along its arcuate path the slide 26 is moved, thus bodily moving the worm 25. The extent of longitudinal movement of the slide determines the extent of rotative move- of the sleeve. this ordinarily being approximately 90° when blanks for drill cutters are to be milled. For changing the limits of cutter movement without changing the extent thereof, the worm 25 is turned on its axis, thus rotating the sleeve 16 and changing the position thereof with respect to the slide 26.

I have illustrated a manually operable means for moving the slide 26, but it will be understood that the invention is not necessarily limited to a manually operable means. As illustrated, there is mounted at the rear of the machine a transverse rock shaft 29 carrying a hand lever 30 by means of which it may be moved. Projecting upward from the shaft 29 is an arm 31 carrying a pin 32 fitting a vertical guideway in the slide 26. It will be clear that when the lever 30 is moved the slide 26 will be moved forward or backward, thus rotating the sleeve 16 and swinging the cutter 10 about the axis of the sleeve. The sleeve 16 is so positioned that its axis intersects the blank at or near the central plane thereof. The cutter is swung through an arc of approximately 90°, thus cutting an arcuate groove in the periphery of the blank extending through approximately 90°. As illustrated, the cutter is in its uppermost position, the worm 25 and the slide 26 being in their extreme rearward positions as determined by the stop screw 27. Downward movement of the lever 30 will swing the cutter 10 in the clockwise direction toward the rear.

It will be obvious that the radius of the arcuate grooves to be cut in the blank must be changed in accordance with the width of the blank. This radius is represented by the distance between the axis of the spindle 18 and the axis of the sleeve 16. I have already stated that the spindle 18 is eccentrically mounted in the sleeve 17 which in turn is eccentrically mounted in the sleeve 16. By turning the sleeve 17 in its bearing in the sleeve 16, the axis of the spindle 18 can be moved toward or away from the axis of the spindle 16. Preferably the sleeves 16 and 17 have the same eccentricity, and in this case the axes of the spindle 18 and of the sleeve 16 can be brought into coincidence or can be separated by a total distance equal to the sum of the eccentricities of the two sleeves 16 and 17.

For adjusting the sleeve 17 relatively to the sleeve 16, worm teeth 34 are formed on the sleeve 17, and these teeth mesh with a worm 35. The worm 35 is rotatably mounted in bearings in a disk 36 which is secured to and rotatable with the sleeve 16. This construction is shown most clearly in Fig. 4. The worm 35 is provided with a squared end and it will be clear that by turning the worm the sleeve 17 can be turned with respect to the sleeve 16. Preferably, for locking the two sleeves in adjusted position, the sleeve 16 is provided with an aperture which intersects the aperture in which the sleeve 17 is positioned. Fitted in this aperture is a shoe 37 which is adapted at its inner end to engage the sleeve 17. By means of a screw 38 the shoe 37 may be forced inward into engagement with the sleeve 17, thus firmly locking it.

I have already stated that the axis of the sleeve 16 must intersect the blank, and it will be clear that the axis must be so positioned as to be at the center of the arcuate groove to be cut. Inasmuch as the axis of the blank is fixed, it is obviously necessary to change the position of the axis of the sleeve 16 in accordance with the diameter of the blank and in accordance with the width thereof. The axis of the sleeve 16 may be adjusted transversely, in accordance with the width of the cutter, by bodily moving the slide 14 and the sleeve 16 by means of the screw 15. To adjust the axis vertically in accordance with the diameter of the blank, I provide means for raising or lowering the bracket 13. The bracket 13 is supported by means of a vertical screw 33 having a squared end by means of which it may be turned. It will be obvious that by turning this screw the bracket 13 may be raised or lowered, carrying with it the sleeve 16 and thus raising or lowering the axis of the sleeve.

The mechanism for supporting, adjusting and rotating the spindle 11 is exactly the same as that for the spindle 10. The swinging movement of the cutter is effected by means of an arm 39 similar to the arm 31 and carrying a pin 40 similar to the pin 32. The two levers 31 and 39 together with the operating lever 30 constitute unitary mechanism for feeding both of the cutters simultaneously. In practice, the mechanism for the cutter 11 is differently adjusted so as to enable the cutter 11 to act at the bottom of the blank A. The parts are so adjusted that the axis of the spindle 18 lies below instead of above the axis of the sleeve 16. The result is that when the sleeve 16 is moved in the clockwise direction the cutter 11 is swung toward the front instead of toward the rear as is the cutter 10.

It will be clear that the two cutters can be independently adjusted. When it is desired to mill blanks having complete semi-circular contours, the two cutters are adjusted with their axes in similar relations to the blank and with their radii of arcuate movements equal. Each cutter can be moved through an arc of approximately 90°, indexing being effected after each engagement of the cutters with the blank. The result is that, when the blank has been indexed through a complete revolution, both sides of the blank will have been milled, the grooves cut by the respective cutters joining each other to form complete semi-circular grooves. It is possible, and in fact it may be preferable, for cutters with semi-circular contours to adapt the mechanism so that each cutter can swing through approximately 180°. In this case each cutter can cut a complete semi-circular groove, two such grooves being cut at the same time, and it will be necessary to index the blank through only one-half of a revolution.

For milling drill cutters such as heretofore referred to, the radii at the two sides of the blank are different and for this reason the two cutters 10 and 11 must be independently adjusted. The eccentric sleeves for the respective cutters are relatively rotated to give the proper radii, and the two slides 14 are respectively adjusted vertically and horizontally so that the finished grooves will join each other in the proper way.

The indexing mechanism 6 may be operated automatically in timed relation with the arcuate movements of the cutters, but I have illustrated devices for operating the indexing mechanism manually. As shown, a hub 41 is keyed to the outer end of the spindle 4 and an indexing disk 42 is detachably secured to the hub. This disk has notches in its periphery corresponding in number and spacing to the grooves to be cut in the blank. Rotatably mounted on the hub 41 adjacent the disk 42 is an oscillatory disk 43. A ratchet wheel 44 is secured to the end of the spindle 4, preferably being held by the same key which holds the hub 41. A nut 45 at the end of the spindle holds all of these parts in place.

Extending transversely of the machine and mounted in suitable bearings in the main frame is a rotatable shaft 46. This shaft is provided at its front end with a crank 47 by means of which it may be turned. At the rear end the shaft 46 carries a disk 48 to which are secured cam plates 49 and 50 so shaped that a cam groove 51 is formed between them. A lever 52 is pivotally mounted at one end on the main frame at 53 and is provided between its ends with a roller 54 which enters the cam groove 51. Connected with the lever 52 at the end opposite the pivot is a link 55 which extends upward and is connected at its upper end with the disk 43. The cam groove 51 is so shaped that when the crank 47 is turned the lever 52 will be oscillated upward and downward. By means of the link 55 an oscillation of the disk 43 is effected.

The disk 43 carries a spring-pressed pawl 56 which is adapted to engage the teeth of the ratchet wheel 44. At each oscillation of the disk 43 the pawl 56 engages one of the teeth of the ratchet wheel and turns the ratchet wheel and the spindle and the blank through an angle corresponding to the distance between two adjacent grooves. For accurately limiting the turning movement and for holding the spindle in its indexed position, use is made of the notched index plate 42. A spring-pressed plunger 57 is slidably mounted in a bracket carried by the headstock and is normally seated in one of the notches. A pin 58 is carried by the plunger and this pin is adapted to be engaged by a cam surface on a latch 59 pivotally mounted on the disk 43. Normally the pawl 56 is separated from the tooth of the ratchet wheel which is to be next engaged and the cam surface on the latch 59 is in close proximity to the pin 58. The result is that when the disk 43 is turned the cam surface on the latch first engages the pin to withdraw the plunger 58 from the notch. Thereafter the continued movement of the disk 43 brings the pawl 56 into engagement with the tooth of the ratchet wheel. The spindle is then turned, carrying the disk 42 with it. The cam surface, having passed the pin 58, permits the plunger to engage the next notch under the influence of the spring. On the return movement of the disk 43 the back of the cam element of the latch 59 engages the pin 58 thus causing the latch 59 to swing outward to pass the pin 58.

Obviously indexing can not take place while the cutters are in engagement with the blank. The cutters must be withdrawn and I preferably withdraw them radially outward when they are respectively at the upper and lower limits of arcuate movement. The mechanism for withdrawing the cutters is preferably operable in timed relation with the indexing mechanism, whether the latter mechanism be operated automatically or manually.

As shown in the drawings, the mechanism for withdrawing the cutters is connected to be operated by the shaft 46, which effects the indexing. Rotatably mounted in suitable bearings in the main frame is a short longitudinal shaft 60. This shaft is provided at its respective ends with cam plates 61 and 62 which serve respectively to vertically move the supporting mechanisms for the cutters 10 and 11. Referring first to the mechanism at the right-hand side, there is interposed between the main frame and the bracket 13 a vertical slide 63 which preferably fits a vertical guideway in the bracket. The screw 33, which has before been mentioned as supporting the bracket, is carried by this slide. The slide 63 carries a roller 64 which rests upon the cam plate 61. This cam plate therefore serves to support the slide 63 and, through the adjustable screw 33, serves to support the bracket 13 and all of the parts carried thereby, including the cutter 10. Similarly the cam plate 62 serves to support the corresponding slide 63 and all of the parts carried thereby, including the cutter 11. The two cam plates 61 and 62 are similarly shaped but are definitely positioned on the shaft so that one of the slides 63 is raised when the other is lowered and vice versa. Preferably, coil springs 65, 65 are provided for holding the rollers 64, 64 in firm engagement with the cam plates 61 and 62. These springs abut at their lower ends against the heads of screws 66, 66, secured respectively to the slides 63, 63, and abut at their upper ends against bosses 67, 67 on the main frame.

The shaft 60 has mounted upon it a spiral gear 68 which meshes with a spiral gear 69 secured to the shaft 46. The result is that when the crank 47 is turned to move the shaft 46, the shaft 60 is moved in synchronism.

During the cutting operation the crank 47 is in its uppermost position, as shown, the cutters being moved in their arcuate paths by means of the lever 30. When indexing is to be effected the operator turns the crank 47 in the clockwise direction, thus turning the shaft 60 in the clockwise direction. The cam 61 is so placed on the shaft that it raises the corresponding slide 63 and raises the cutter 10 out of engagement with the blank. At the same time the cam 62 lowers the corresponding slide 63 and thus lowers the cutter 11 out of engagement with the blank. Continued movement of the shaft 46 causes the upward movement of the lever 52 in the way described, thus effecting indexing. Indexing takes place while the cutters 10 and 11 are respectively in their uppermost and lowermost positions. Indexing is complete when the crank 47 has been turned through approximately three-fourths of a revolution. After indexing, the crank 47 is turned in the counter-clockwise direction. The disk 43 is restored to its original position and the reversed movement of the cams permits the cutters 10 and 11 to be respectively lowered and raised slowly, cutting their way into the blank. When the crank 47 has been restored to its normal upper position the cutters have cut the grooves to the required depth in the blank. Thereafter the operator, by means of the lever 30, swings the cutters respectively about the axes of the sleeves 16 in the way already described, thus cutting the arcuate grooves.

What I claim is:

1. In a machine for milling longitudinal grooves in blanks, the combination of means for holding and indexing a blank, two rotatable milling cutters arranged to act simultaneously on the blank at opposite sides thereof, and unitary mechanism for simultaneously feeding the cutters longitudinally across the blank in opposite directions.

2. In a machine for milling longitudinal grooves in blanks, the combination of means for holding and indexing a blank, two rotatable milling cutters arranged to act simultaneously on the blank at opposite sides thereof, unitary mechanism for simultaneously feeding the cutters longitudinally across the blank in opposite directions, and means whereby the two cutters may be independently adjusted with respect to the blank.

3. In a machine for milling longitudinal grooves in blanks, the combination of means for holding and indexing a blank, two rotatable milling cutters arranged to act simultaneously on the blank, and means for guiding the cutters in arcuate paths about axes perpendicular to the blank axis.

4. In a machine for milling longitudinal grooves in blanks, the combination of means for holding the blank, two rotatable milling cutters arranged to act simultaneously on a blank, means for guiding the cutters in arcuate paths about axes perpendicular to the blank axis, means for feeding said cutters across the blank in said arcuate path, and means for indexing the blank between the feeding movements of the cutters.

5. In a machine for milling longitudinal grooves in blanks, the combination of means for holding and indexing a blank, two rotatable milling cutters arranged to act simultaneously on the blank, means for guiding the cutters in arcuate paths about axes perpendicular to the blank axis, and unitary mechanism for feeding the cutters simultaneously across the blank.

6. In a machine for milling longitudinal grooves in blanks, the combination of means for holding and indexing a blank, two rotatable milling cutters arranged to act simultaneously on the blank, means for guiding the cutters in arcuate paths about axes perpendicular to the blank axis, and unitary mechanism for simultaneously feeding the cutters across the blank in opposite directions.

7. In a machine for milling longitudinal grooves in blanks for milling cutters, the combination of means for holding and indexing a blank, two rotatable milling cutters arranged to act simultaneously on the blank, mechanisms serving respectively to guide the cutters in arcuate paths, and means for operating the said mechanisms simultaneously comprising a rock shaft, a lever for moving the rock shaft and two arms secured to the rock shaft and respectively connected with the mechanisms.

8. In a machine for milling longitudinal grooves in blanks, the combination of means for holding and indexing a blank, a rotatable milling cutter, means for guiding the cutter in an arcuate path, and mechanism for feeding the cutter in the said path, the said mechanism comprising a circular toothed element and a longitudinally movable rectilinear toothed element meshing with the said circular element.

9. In a machine for milling longitudinal grooves in blanks, the combination of means for holding and indexing a blank, a rotatable milling cutter, means for guiding the cutter in an arcuate path, and mechanism for feeding the cutter in the said path, the said mechanism comprising a worm wheel and a longitudinally movable worm meshing with the said worm wheel.

10. In a machine for milling longitudinal grooves in blanks, the combination of means for holding and indexing a blank, two rotatable milling cutters arranged to act simultaneously on the blank, means for guiding the cutters in arcuate paths, and unitary mechanism for simultaneously feeding the cutters in the said paths, the said mechanism comprising two worms connecting respectively with the cutters and two longitudinally movable worms meshing with the said worm wheels.

11. In a machine for milling longitudinal grooves in blanks, the combination of means for holding and indexing a blank, two rotatable milling cutters arranged to act simultaneously on the blank, means for guiding the cutters in arcuate paths, unitary mechanism for simultaneously feeding the cutters in the said paths, and means whereby the cutters may be adjusted independently of each other in the said arcuate paths.

12. In a machine for milling longitudinal grooves in blanks, the combination of means for holding and indexing a blank, two rotatable milling cutters arranged to act simultaneously on the blank, means for guiding the cutters in arcuate paths, unitary mechanism for simultaneously feeding the cutters in the said paths, the said mechanism comprising two worms connected respectively with the cutters and two longitudinally movable worms meshing with the said worm wheels, and means whereby the worms may be turned independently of each other to adjust the cutters in the said arcuate paths.

13. In a machine for milling longitudinal grooves in blanks, the combination of means for holding and indexing a blank, a rotatable milling cutter, means for guiding the cutter in an arcuate path, mechanism for feeding the cutter in the said path, and means for adjusting the said guiding means to move the axis of the said arcuate path.

14. In a machine for milling longitudinal grooves in blanks, the combination of means for holding and indexing a blank, a rotatable milling cutter, means for guiding the cutter in an arcuate path, mechanism for feeding the cutter in the said path, and means for adjusting the said guiding means to move the axis of the said arcuate path either vertically or horizontally or both.

15. In a machine for milling longitudinal grooves in blanks, the combination of means for holding and indexing a blank, two rotatable milling cutters arranged to act simultaneously on the blank, means for guiding the cutters in arcuate paths, and means for adjusting the cutters to change the axes of their arcuate movements.

16. In a machine for milling longitudinal grooves in blanks, the combination of means for holding a blank, two rotatable milling cutters arranged to act simultaneously on the blank, means for guiding the cutters in arcuate paths, means for adjusting the cutters to change the axes of their arcuate movements, means for feeding said cutters across the blank in said arcuate path, and means for indexing the blank between the feeding movements of the cutters.

17. In a machine for milling longitudinal grooves in blanks for milling cutters, the combination of means for holding and indexing a blank, two rotatable milling cutters a anged to act simultaneously on the blank, means for guiding the cutters in arcuate paths, and means for independently adjusting the cutters to change the axes of their arcuate movements.

18. In a machine for milling longitudinal grooves in blanks, the combination of means for holding and indexing a blank, two rotatable milling cutters arranged to act simultaneously on the blank, means for guiding the cutters in arcuate paths, and means for adjusting the cutters to horizontally or vertically move the axes of the arcuate movements.

19. In a machine for milling longitudinal grooves in blanks, the combination of means for holding and indexing a blank, two rotatable milling cutters arranged to act simultaneously on the blank, means for guiding the cutters in arcuate paths, and means for adjusting the cutters to change the radii of their arcuate movements.

20. In a machine for milling longitudinal grooves in blanks, the combination of means for holding and indexing a blank, two rotatable milling cutters arranged to act simultaneously on the blank, means for guiding the cutters in arcuate paths, and means for adjusting the cutters independently of each other to change the radii of their arcuate movements.

21. In a machine for milling longitudinal grooves in blanks, the combination of means for holding a blank, two rotatable milling cutters arranged to act simultaneously on the blank, means for guiding the cutters in the arcuate paths, means for adjusting the cutters independently of each other to change the radii of their arcuate movements, means for feeding said cutters across the blank in said arcuate path, and means for indexing the blank between feeding movements of the cutters.

22. In a machine for milling longitudinal grooves in blanks, the combination of means for holding and indexing a blank, two rotatable milling cutters arranged to act simultaneously on the blank, and mechanisms respectively serving to guide the cutters in arcuate paths, each mechanism comprising a rotatable eccentric sleeve, a second rotatable eccentric sleeve mounted in the first sleeve, a rotatable cutter spindle mounted in the second sleeve and means for effecting relative rotative adjustment of the two sleeves.

23. In a machine for milling longitudinal grooves in blanks, the combination of means for holding and indexing a blank, two rotatable milling cutters arranged to act simultaneously on the blank, mechanisms respectively serving to guide the cutters in arcuate paths, each mechanism comprising a rotatable eccentric sleeve, a second rotatable eccentric sleeve mounted in the first sleeve, a rotatable cutter spindle mounted in the second sleeve and means for effecting relative rotative adjustment of the two sleeves, and means for simultaneously moving the cutters by rotating the first said sleeves of the respective mechanisms.

24. In a machine for milling longitudinal grooves in blanks, the combination of means for holding and indexing a blank, two rotatable milling cutters arranged to act simultaneously on the blank, mechanisms respectively serving to guide the cutters in arcuate paths, each mechanism comprising a rotatable eccentric sleeve, a second rotatable eccentric sleeve mounted in the first sleeve, a rotatable cutter spindle mounted in the second sleeve and means for effecting relative rotative adjustment of the two sleeves, and unitary mechanism for simultaneously moving the cutters by rotating the first said sleeves of the respective guiding mechanisms, the said unitary mechanism comprising two worms connected respectively with the cutters and two longitudinally movable worms meshing with the said worm wheels.

25. In a machine for milling longitudinal grooves in blanks, the combination of means for holding and indexing a blank, two rotatable milling cutters arranged to act simultaneously on the blank at opposite sides thereof, and unitary mechanism for withdrawing the cutters simultaneously from the blank.

26. In a machine for milling longitudinal grooves in blanks, the combination of means for holding and indexing a blank, two rotatable milling cutters arranged to act simultaneously on the blank at opposite sides thereof, and means for withdrawing the cutters simultaneously radially outward from the blank.

27. In a machine for milling longitudinal grooves in blanks, the combination of means for holding and indexing a blank, two rotatable milling cutters arranged to act simultaneously on the blank at the top and bottom thereof respectively, two cams serving respectively to support the cutters, and means for moving the cams simultaneously to respectively raise and lower the cutters out of engagement with the blank.

28. In a machine for milling longitudinal grooves in blanks, the combination of means for holding and indexing a blank, two rotatable milling cutters arranged to act simultaneously on the blank at the top and bottom thereof respectively, two cams serving respectively to support the cutters, devices interposed respectively between the cams and the cutters for vertically adjusting the cutters, and means for moving the cams simultaneously to respectively raise and lower the cutters out of engagement with the blank.

29. In a machine for milling longitudinal grooves in blanks, the combination of means for holding a blank, two rotatable milling cutters arranged to act simultaneously on the blank at opposite sides thereof, and mechanism for withdrawing the cutters simultaneously from the blank and for then indexing the blank.

30. In a machine for milling longitudinal grooves in blanks, the combination of means for holding a blank, two rotatable milling cutters arranged to act simultaneously on the blank at opposite sides thereof, and mechanism for withdrawing the cutters simultaneously relatively rapidly from the blank, for then indexing the blank and for then feeding the cutters relatively slowly into the blank.

31. In a machine for milling longitudinal grooves in blanks, the combination of means for holding a blank, two rotatable milling cutters arranged to act simultaneously on the blank at opposite sides thereof, means for withdrawing the cutters simultaneously from the blank, means for indexing the blank, a rotatable shaft connected with indexing means, and a second rotatable shaft driven from the first shaft and connected with the withdrawing means.

In testimony whereof, I hereto affix my signature.

FRIEDERICH MÜLLER.